(12) United States Patent
Kudo

(10) Patent No.: US 7,620,803 B2
(45) Date of Patent: Nov. 17, 2009

(54) DATA PROCESSING DEVICE AND ELECTRONIC EQUIPMENT USING PIPELINE CONTROL

(75) Inventor: Makoto Kudo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 10/601,005

(22) Filed: Jun. 20, 2003

(65) Prior Publication Data

US 2004/0039901 A1 Feb. 26, 2004

(30) Foreign Application Priority Data

Jun. 25, 2002 (JP) .............................. 2002-184379

(51) Int. Cl.
*G06F 7/38* (2006.01)
*G06F 9/00* (2006.01)
*G06F 9/44* (2006.01)
*G06F 15/00* (2006.01)
*G06F 9/30* (2006.01)
*G06F 9/40* (2006.01)

(52) U.S. Cl. ..................... 712/233; 712/214; 712/200; 712/205

(58) Field of Classification Search ................. 712/205, 712/214, 200, 237, 233
See application file for complete search history.

(56) References Cited

U.S. PATENT DOCUMENTS

| | | | | |
|---|---|---|---|---|
| 5,655,096 A | * | 8/1997 | Branigin ..................... | 712/200 |
| 5,768,575 A | * | 6/1998 | McFarland et al. .......... | 712/228 |
| 5,784,584 A | * | 7/1998 | Moore et al. ................. | 712/200 |
| 6,112,019 A | * | 8/2000 | Chamdani et al. ........... | 712/214 |
| 6,157,988 A | * | 12/2000 | Dowling ..................... | 711/140 |
| 6,311,261 B1 | * | 10/2001 | Chamdani et al. ............ | 712/23 |

FOREIGN PATENT DOCUMENTS

| | | |
|---|---|---|
| JP | 03-033933 | 2/1991 |
| JP | 05-313890 | 11/1993 |

\* cited by examiner

*Primary Examiner*—Niketa I Patel
*Assistant Examiner*—Farley J Abad
(74) *Attorney, Agent, or Firm*—Hogan & Hartson LLP

(57) ABSTRACT

A data processing device is provided using pipeline architecture to reduce a time loss due to a branch without causing an increase in circuit scale. The data processing device uses pipeline control. The data processing device includes an instruction queue in which a plurality of instruction codes can be fetched, a fetch address operation circuit which calculates a fetch address, a fetch circuit which fetches an instruction code based on the fetch address, and a branch information setting circuit which decodes a branch setting instruction, stores a branch address in a branch address storage register, and stores a branch target address in a branch target address storage register. The fetch address operation circuit compares either a previous fetch address or an expected next fetch address with a value stored in the branch address storage register, and determines a next fetch address to be output, based on the comparison result.

18 Claims, 9 Drawing Sheets

FIG. 3A
jppr x, y
FIG. 3B
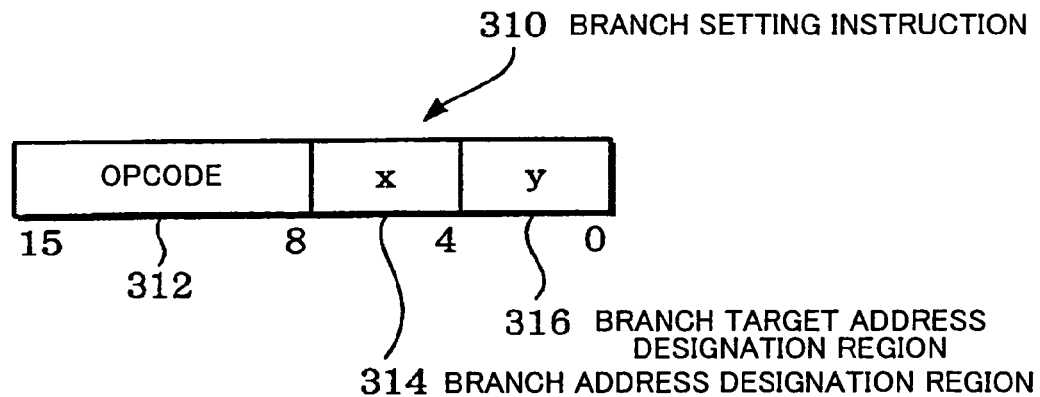
FIG. 3C
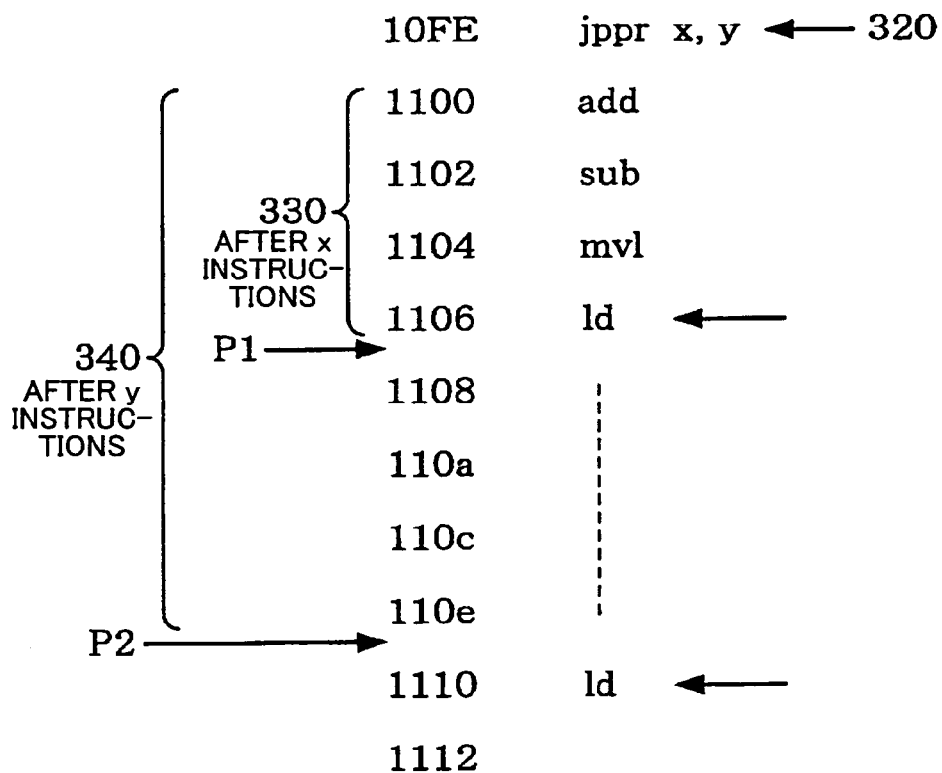

FIG. 5A
loop x, y, z
FIG. 5B
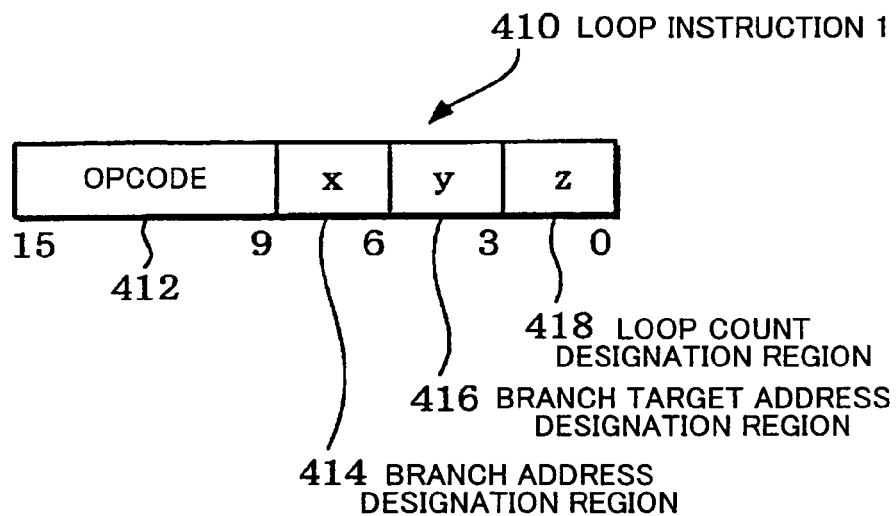
FIG. 5C
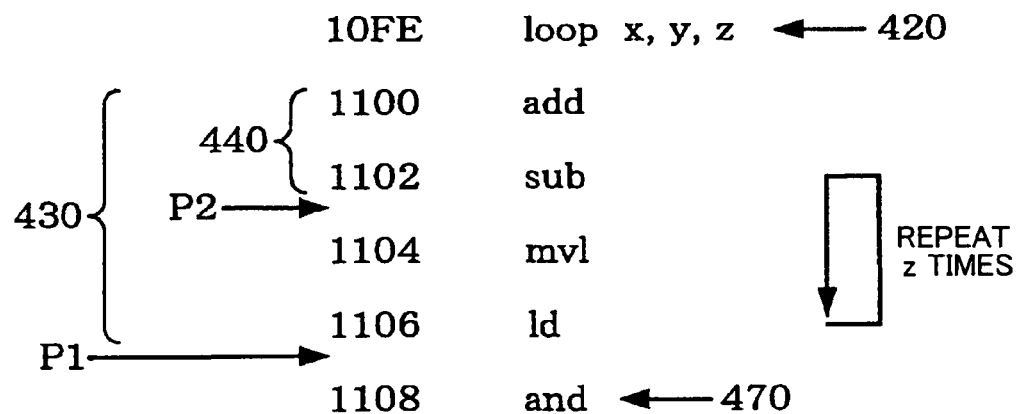

FIG. 7A
loop x, z
FIG. 7B
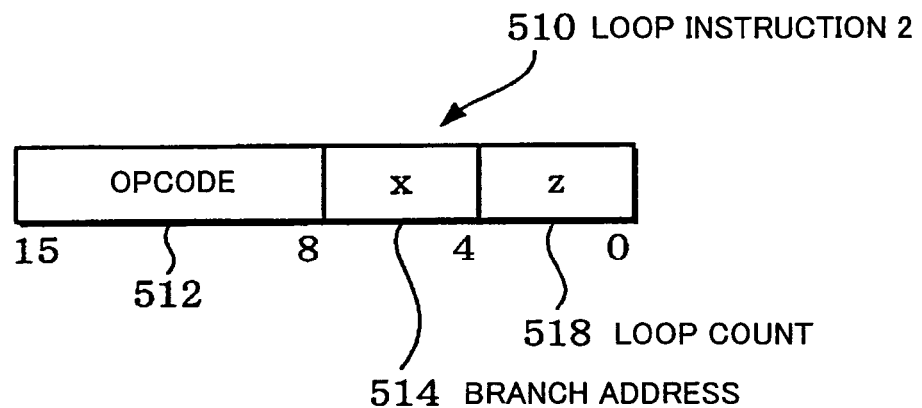
FIG. 7C
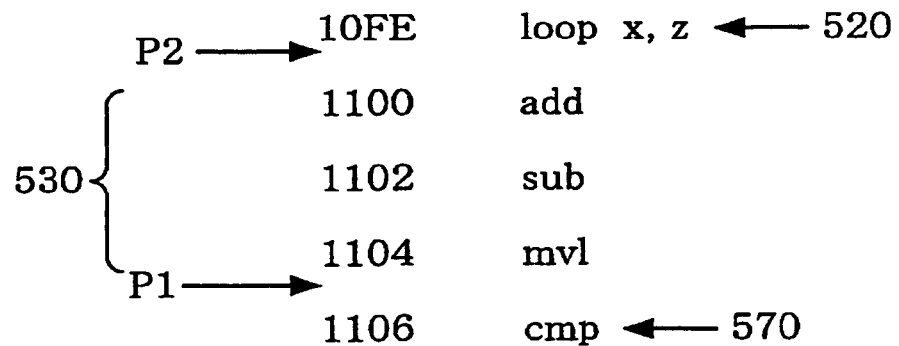

DATA PROCESSING DEVICE AND ELECTRONIC EQUIPMENT USING PIPELINE CONTROL

Japanese Patent Application No. 2002-184379, filed on Jun. 25, 2002, is hereby incorporated by reference in its entirety.

BACKGROUND OF THE INVENTION

The present invention relates to a data processing device and electronic equipment.

In pipeline architecture, if a branch instruction or a loop instruction occurs, a branch target instruction must be newly fetched for execution. Therefore, in pipeline architecture consisting of "Fetch", "Decode", "Execution", and "Write", three clock cycles are wasted each time a branch (including a branch in a loop) occurs.

There may be a case where a branch prediction circuit is provided for a microcomputer in order to prevent such a waste of clock cycles. However, since tens of thousands of gates are necessary for realizing the branch prediction circuit, adding the branch prediction circuit inevitably increases the circuit scale and cost.

BRIEF SUMMARY OF THE INVENTION (1) According to a first aspect of the present invention, there is provided a data processing device using pipeline control including an instruction queue in which a plurality of instruction codes are fetched. A fetch address operation circuit is provided which calculates a fetch address used to fetch an instruction code in the instruction queue. A fetch circuit is provided which fetches an instruction code that is read out based on the fetch address into the instruction queue. A branch information setting circuit is provided which decodes a branch setting instruction instructing a branch to a branch target address when the fetch address is a branch address, stores the branch address in a branch address storage register, and stores the branch target address in a branch target address storage register. The fetch address operation circuit includes a circuit which compares one of a previous fetch address and an expected next fetch address with a value stored in the branch address storage register, and then determines whether or not to output a value stored in the branch target address storage register as a next fetch address, based on the comparison result.

(2) According to a second aspect of the present invention, there is provided a data processing device using pipeline control including an instruction queue in which a plurality of instruction codes are fetched. A fetch address operation circuit is provided which calculates a fetch address used to fetch an instruction code in the instruction queue. A fetch circuit fetches an instruction code that is read out based on the fetch address into the instruction queue. A branch information setting circuit is provided which decodes a branch setting instruction instructing a branch to a branch target address when the fetch address is a branch address, stores the branch address in a branch address storage register, and stores the branch target address in a branch target address storage register. The fetch address operation circuit includes a circuit which compares an expected next fetch address obtained by incrementing a value in a fetch program counter by one instruction length with a value stored in the branch address storage register, and then outputs a value stored in the branch target address storage register as a next fetch address when the expected next fetch address coincides with the value in the branch address storage register, or outputs the expected next fetch address as a next fetch address when the expected next fetch address does not coincide with the value in the branch address storage register.

(3) According to a third aspect of the present invention, there is provided electronic equipment including any of the above data processing devices.

Furthermore, a means for receiving input data and a means for outputting a result of processing the input data by the data processing device is provided.

BRIEF DESCRIPTION OF THE SEVERAL VIEWS OF THE DRAWING

FIGS. 3A, 3B, and 3C are diagrams for illustrating a branch setting instruction in one embodiment of the present invention.

FIGS. 5A, 5B, and 5C are diagrams for illustrating a loop instruction according to one embodiment of the present invention.

FIGS. 7A, 7B, and 7C are diagrams for illustrating another loop instruction according to one embodiment of the present invention. In this loop instruction, a branch target address is an instruction subsequent to the loop instruction.

DETAILED DESCRIPTION OF THE EMBODIMENT

Figure 1:
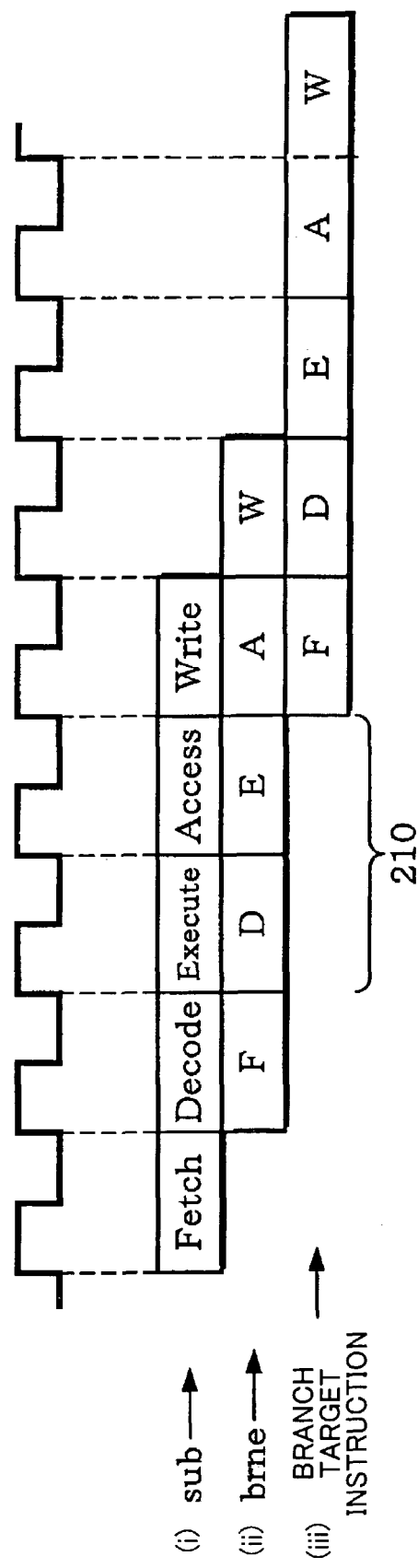
FIGS. 1A and 1B are views illustrating a conventional microcomputer (or a data processing device in a broad sense) using pipeline control in which a branch occurs.

Embodiments of the present invention are described below.

Note that the embodiments described below do not in any way limit the scope of the invention laid out in the claims herein. In addition, all elements of the embodiments described below should not be taken as essential requirements of the present invention.

(1) According to one embodiment the present invention, there is provided a data processing device using pipeline control including an instruction queue in which a plurality of instruction codes are fetched. A fetch address operation circuit is provided which calculates a fetch address used to fetch an instruction code in the instruction queue. A fetch circuit is provided which fetches an instruction code that is read out based on the fetch address into the instruction queue. A branch information setting circuit is provided which decodes a branch setting instruction instructing a branch to a branch target address when the fetch address is a branch address, stores the branch address in a branch address storage register, and stores the branch target address in a branch target address storage register. The fetch address operation circuit includes a circuit which compares one of a previous fetch address and an expected next fetch address with a value stored in the branch address storage register, and then determines whether or not to output a value stored in the branch target address storage register as a next fetch address, based on the comparison result.

The branch setting instruction includes branch address specifying information and branch target address specifying information in operands thereof either explicitly or implicitly.

The branch address specifying information can be a value capable of specifying a location at which a branch occurs. The branch address specifying information may be an address of an instruction at which a branch occurs. The branch address specifying information may be a relative address between the branch setting instruction address and the branch address, or the number of instructions present between the branch setting instruction address and the branch address. The branch target address specifying information may be a number of a general-purpose register in which one of the above values is stored.

Similarly, the branch target address specifying information can be a value capable of specifying the branch target. For example, the branch target address specifying information may be an address of a branch target instruction. The branch target address specifying information may be a relative address between the branch setting instruction address and the branch target address, or the number of instructions present between the branch setting instruction address and the branch target address. The branch target address specifying information may be a number of a general-purpose register in which one of these values is stored.

Furthermore, the previous fetch address may be a previous fetch address in a fetch program counter. The expected next fetch address is a fetch address calculated based on the previous fetch address. If either the previous fetch address or the expected next fetch address coincides with the value stored in the branch address storage register, a value stored in the branch target address storage register may be output as a next fetch address. If the previous fetch address and the expected next fetch address do not coincide with the value stored in the branch address storage register, a value obtained by incrementing the value of the fetch program counter by one instruction length may be output as a next fetch address.

If the branch address designated by the branch setting instruction is stored in the branch address storage register before one of the previous fetch address in the fetch program counter and the expected next fetch address calculated based on the previous fetch address coincides with the value stored in the branch address storage register, the branch target instruction can be fetched in pipeline control without a loss when a branch occurs.

According to this data processing device, architecture including the branch setting instruction in the instruction set can be implemented by merely adding the fetch address operation circuit and the branch information setting circuit, and a high cost-performance data processing device which employs pipeline architecture and is capable of reducing a time loss due to occurrence of a branch without increasing the circuit scale.

(2) According to another embodiment of the present invention, there is provided a data processing device using pipeline control including an instruction queue in which a plurality of instruction codes are fetched. A fetch address operation circuit is provided which calculates a fetch address used to fetch an instruction code in the instruction queue. A fetch circuit is provided which fetches an instruction code that is read out based on the fetch address into the instruction queue. A branch information setting circuit is provided which decodes a branch setting instruction instructing a branch to a branch target address when the fetch address is a branch address, stores the branch address in a branch address storage register, and stores the branch target address in a branch target address storage register. The fetch address operation circuit includes a circuit which compares an expected next fetch address obtained by incrementing a value in a fetch program counter by one instruction length with a value stored in the branch address storage register, and then outputs a value stored in the branch target address storage register as a next fetch address when the expected next fetch address coincides with the value in the branch address storage register, or outputs the expected next fetch address as a next fetch address when the expected next fetch address does not coincide with the value in the branch address storage register.

The branch setting instruction includes branch address specifying information and branch target address specifying information in operands thereof either explicitly or implicitly.

The branch address specifying information can be a value capable of specifying a location at which a branch occurs. For example, branch address specifying information may be an address of an instruction at which a branch occurs. The branch address specifying information may be a relative address between the branch setting instruction address and the branch address, or the number of instructions present between the branch setting instruction address and the branch address. The branch target address specifying information may be a number of a general-purpose register in which one of the above values is stored.

Similarly, the branch target address specifying information can be a value capable of specifying the branch target. The branch target address specifying information may be an address of a branch target instruction. The branch target address specifying information may be a relative address between the branch setting instruction address and the branch target address, or the number of instructions present between the branch setting instruction address and the branch target address. The branch target address specifying information may be a number of a general-purpose register in which one of these values is stored.

If the branch address designated by the branch setting instruction is stored in the branch address storage register before the expected next fetch address obtained by incrementing the value in the fetch program counter by the instruction length coincides with the value stored in the branch address storage register, the branch target instruction can be fetched in pipeline control without a loss when a branch occurs.

According to this data processing device, architecture including the branch setting instruction in the instruction set can be implemented by merely adding the fetch address operation circuit and the branch information setting circuit, and a high cost-performance data processing device which employs pipeline architecture and is capable of reducing a time loss due to occurrence of a branch can be provided without increasing the circuit scale.

(3) In any one of the data processing devices, the branch setting instruction may include a loop instruction which designates a loop count. The branch information setting circuit may decode the loop instruction which instructs to repeat a branch to the branch target address the number of times equal to the loop count, and store the loop count designated by the loop instruction. The fetch address operation circuit may include a circuit which outputs a value stored in the branch target address storage register as a next fetch address until the number of times the branch to the branch target address repeats reaches the loop count.

The loop count included in the loop instruction may be set in a loop counter, and the loop counter may be decremented each time when a branch to the branch target address occurs, for example. A branch to the branch target address may be terminated when the value of the loop counter reaches zero.

According to this data processing device, since the branch target address can be output as a fetch address after the loop instruction is executed, the branch target instruction can be fetched without causing a loss in pipeline control due to a branch by loop.

Moreover, since it is unnecessary to use a SUB instruction for decrementing the loop counter which is necessary for the loop using no loop instruction, the execution time can be increased.

According to this data processing device, architecture including the loop instruction in the instruction set can be implemented by merely adding the fetch address operation circuit and the branch information setting circuit, and a high cost-performance data processing device which employs pipeline architecture and is capable of reducing a time loss due to occurrence of a loop and can be provided without increasing the circuit scale.

(4) In any one of the data processing devices, the branch setting instruction may include a loop instruction which designates a loop count. The branch information setting circuit may decode the loop instruction which instructs to repeat a branch to the branch target address the number of times equal to the loop count, and store the loop count designated by the loop instruction. The fetch address operation circuit may include a circuit which decrements a value set in the loop counter each time when a branch to the branch target address occurs, and output a value obtained by incrementing the branch address by one instruction length as a next fetch address when the value of the loop counter reaches zero.

According to this data processing device, since the branch target address can be output as a fetch address after the loop instruction is executed, the branch target instruction can be fetched without causing a loss in pipeline control due to a branch by loop.

Moreover, since it is unnecessary to use a SUB instruction for decrementing the loop counter which is necessary for the loop using no loop instruction, the execution time can be increased.

According to this data processing device, architecture including the loop instruction in the instruction set can be implemented by merely adding the fetch address operation circuit and the branch information setting circuit, and a high cost-performance data processing device which employs pipeline architecture capable of reducing a time loss due to occurrence of a loop without increasing the circuit scale.

(5) In any one of the data processing devices, the loop instruction may have the branch target address which is fixed relative to the loop instruction and also have no branch target address information in an operand. The branch information setting circuit may include a circuit which calculates the value fixed relative to the loop instruction and store the calculated value in the branch target address storage register.

The term "fixed relative to the loop instruction" means that a relative distance from the loop instruction can be determined uniquely.

For example, the branch target address may be fixed relative to an instruction subsequent to the loop instruction.

According to this data processing device, since information in operands of the loop instruction can be reduced, the device is effective in the case where the loop instruction must be written with a short instruction code length.

(6) According to still another embodiment of the present invention, there is provided electronic equipment including any one of the above data processing devices. A means for receiving input data is provided and a means for outputting a result of processing the input data by the data processing device is provided.

According to the present invention, high-function electronic equipment can be provided at low cost since the electronic equipment is equipped with an inexpensive high-speed data processing device.

Preferred embodiments of the present invention are described below in detail with reference to the drawings.

1. Data Processing Device (1) Configuration of Data Processing Device

FIGS. 1A and 1B are views illustrating a conventional example in the case where a branch occurs in a microcomputer (data processing device in a broad sense) which controls pipeline processing.

FIG. 1A shows an example of an instruction list which causes a branch to occur.

FIG. 1B shows a timetable in which instructions (i) to (iii) are processed in a microcomputer which controls five stages of pipeline processing consisting of Fetch (F), Decode (D), Execute (E), Access (A), and Write (W).

A fetch address in the Fetch (F) stage of the pipeline control is generally given by "present fetch address=previous fetch address+size of instruction fetched last time". Therefore, in the case where a branch instruction occurs, a branch target instruction has not been fetched in the fetch queue.

The instruction (ii) shown in FIG. 1B is a branch instruction and the instruction (iii) is a branch target instruction. Since the branch target instruction must be fetched after the branch instruction is executed, a delay inevitably occurs for two clock cycles as indicated by reference numeral 210.

In the case where loop processing is performed by using a branch instruction, since the instruction (i) sub is necessary for counting, one additional clock cycle is needed.

Figure 2:
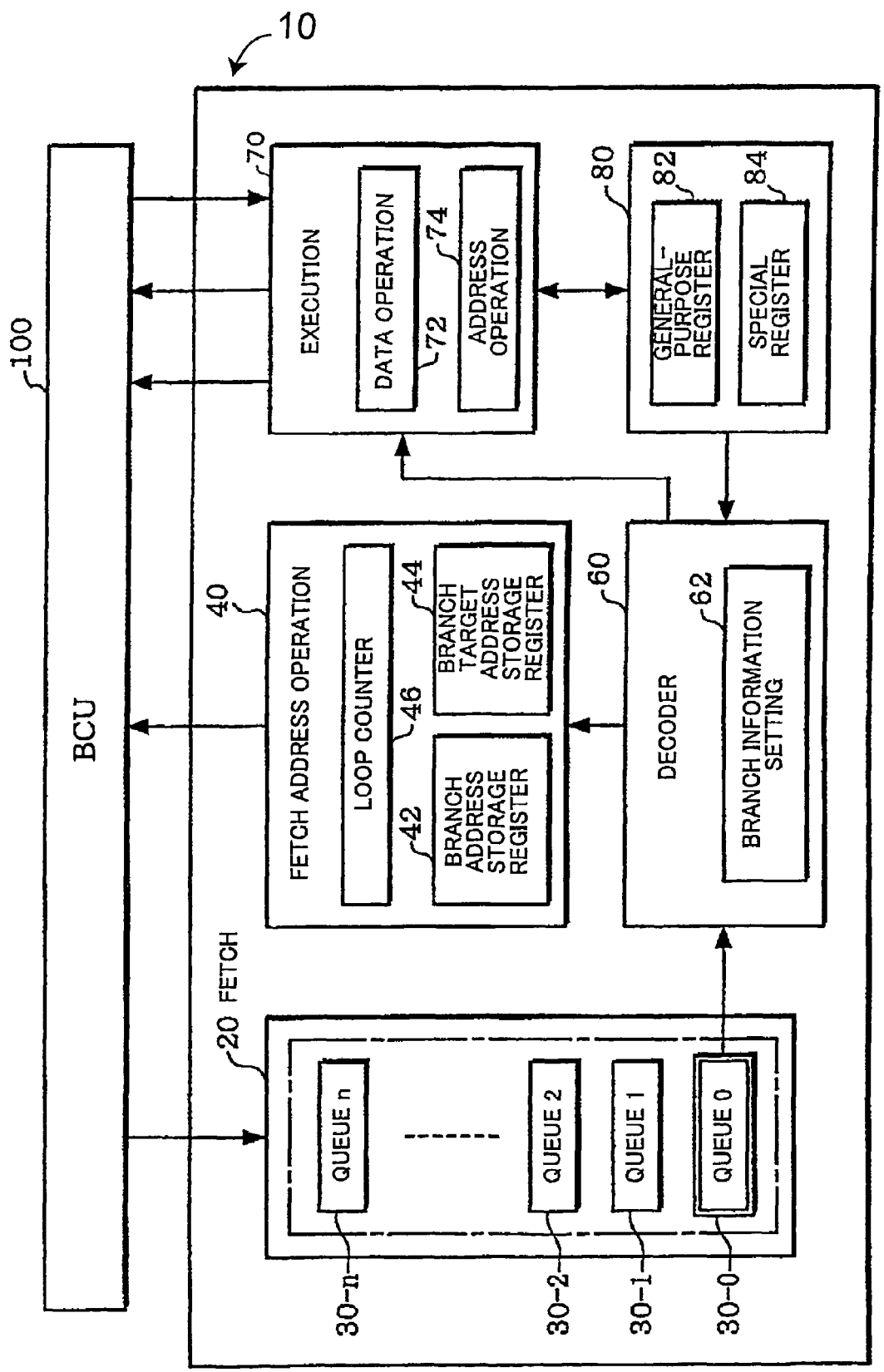
FIG. 2 is a functional block diagram showing a microcomputer (or a data processing device in a broad sense) according to one embodiment of the present invention.

FIG. 2 is a functional block diagram illustrating a configuration of a microcomputer (data processing device in a broad sense) in the present embodiment.

A microcomputer in the present embodiment includes a CPU (processing circuit in a broad sense) 10 and a BCU (bus control unit) 100. The microcomputer may also include various types of peripheral circuits such as a ROM (Read Only Memory), RAM (Random Access Memory), MMU (Memory Management Unit), DMAC (Direct Memory Access Controller), LCD (Liquid Crystal Display) driver, and SIO (Serial Input Output).

The CPU 10 controls pipeline processing for instruction fetching, instruction decoding, operation processing, writing into a register, and the like according to a program stored in a ROM or RAM. The CPU 10 handles 32-bit width data, but processes a 16-bit instruction code.

The BCU 100 controls various buses such as a 32-bit instruction data bus, an instruction address bus for instruction data access, a 32-bit data bus, a data address bus for data access, and a control bus for control signals (not shown).

The CPU 10 exchanges signals with the outside through these various buses.

The CPU 10 includes a fetch circuit 20, a fetch address operation circuit 40, a decoder circuit 60, an execution circuit 70, a register file 80 (general-purpose register 82 and special register 84), and the like.

The fetch circuit 20 prefetches instruction codes of a plurality of instructions in instruction queues (prefetch queues, for example) 30-0, 30-1 . . . .

The fetch address operation circuit 40 is a circuit which calculates a fetch address for fetching the instruction code in the instruction queue. The fetch address operation circuit 40 includes a branch address storage register 42 and a branch target address storage register 44. The fetch address operation circuit 40 may compare either the previous fetch address or the expected next fetch address with the value stored in the branch address storage register, and output the value stored in the branch target address storage register as the next fetch address based on the comparison results.

The fetch address operation circuit 40 may compare the expected next fetch address obtained by incrementing a value retained in a fetch program counter by a number corresponding to one instruction length with the value stored in the branch address storage register. The fetch address operation circuit 40 may output the value stored in the branch target address storage register as the next fetch address if the expected next fetch address coincides with the value stored in the branch address storage register, and output a value obtained by incrementing the value retained in the fetch program counter by a number corresponding to one instruction length as the next fetch address if the expected next fetch address does not coincide with the value stored in the branch address storage register.

The fetch address operation circuit 40 may output the value stored in the branch target address storage register 44 as the next fetch address based on the comparison results until the number of branches to the branch target address reaches a loop count.

For example, the fetch address operation circuit 40 may include a loop counter circuit 46 which sets the loop count set in the loop instruction in a loop counter (not shown), and decrements the loop counter each time a branch to the branch target address occurs.

The decoder circuit 60 is a circuit which is connected with the instruction queue through a signal line, and performs processing which allows the instruction code fetched in the instruction queue to be input thereto and decodes the input instruction code. The decoder circuit 60 includes a branch information setting circuit 62.

The branch information setting circuit 62 is connected with the branch address storage register 42 and the branch target address storage register 44 through a signal line. The branch information setting circuit 62 decodes a branch setting instruction which causes a branch to the branch target address to occur at the branch address, stores the branch address in the branch address storage register, and stores the branch target address in the branch target address storage register.

The branch information setting circuit 62 may be connected with a loop count setting register (not shown) provided to the loop counter circuit 46 through a signal line. The branch information setting circuit 62 may decode a loop instruction which causes a branch to the branch target address to occur at the branch address before reaching the loop count, fetch the loop count set in the loop instruction, and store the loop count in the loop count setting register.

The execution circuit 70 executes an instruction based on operation contents of the instruction decoded by the decoder circuit 60. The execution circuit 70 includes a data operation circuit 72 which calculates data and an address operation circuit 74 which calculates an address, and executes the function of the instruction decoded by the decoder circuit 60 while optionally accessing the general-purpose register 82 or a memory (RAM or the like).

(2) Branch Setting Instruction

FIGS. 3A, 3B, and 3C are views illustrating an example of a branch setting instruction in the present embodiment.

FIG. 3A shows an example of an instruction code of the branch setting instruction. FIG. 3B is a view showing a bit field of the instruction code of the branch setting instruction. An instruction code 310 of the branch setting instruction includes an 8-bit operation code (opcode) designation region 312 from the bit 15 to the bit 8, a 4-bit branch address designation region 314 from the bit 7 to the bit 4, and a 4-bit branch target address designation region 316 from the bit 3 to the bit 0.

An opcode which indicates that the instruction is a branch setting instruction is stored in the opcode designation region 312.

A value which indicates whether the branch address or the branch target address is after a certain number of instructions from the branch setting instruction may be designated in the branch address designation region 314 or the branch target address designation region 316. In the case where the value which indicates whether the branch target address is after a certain number of instructions from the branch setting instruction is designated by immediate data "imm4", for example, the branch target address is given by "PC (program counter)+instruction length+imm4×instruction length". The branch address or the branch target address may be designated by either a relative address from the branch setting instruction or an absolute address. A value for a general-purpose register in which the above value is stored may be designated in the branch address designation region 314 or the branch target address designation region 316.

FIG. 3C shows a program list including the branch setting instruction. In the case where a branch setting instruction "jppr x, y" is placed at 320, a branch to P2 (branch target address) after y instructions (see 340) from the branch setting instruction occurs at P1 (branch address) after x instructions (see 330) from the branch setting instruction.

Figure 4:
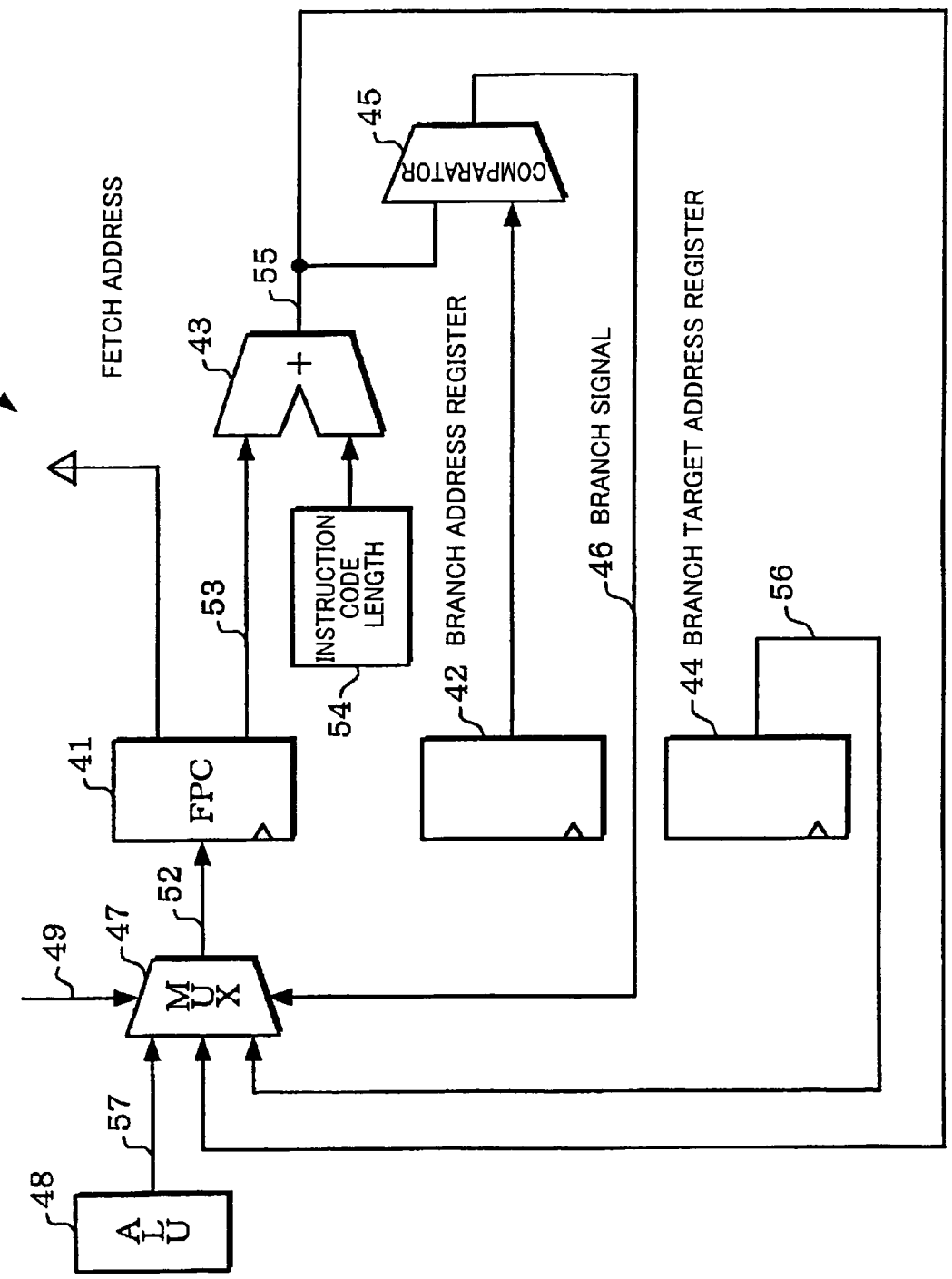
FIG. 4 is a diagram for illustrating a fetch address operation circuit.

FIG. 4 is a view illustrating an example of a configuration of the fetch address operation circuit.

The fetch address operation circuit 40 includes a fetch program counter (FPC) 41, a branch address register 42, a branch target address register 44, and the like. The fetch program counter (FPC) 41 is a program counter in which an instruction address to be fetched is stored, and is updated to the next fetch address each time the instruction is fetched.

A branch address designated in the branch setting instruction is retained in the branch address storage register 42.

A branch target address designated in the branch setting instruction is retained in the branch target address storage register 44.

When the instruction code is fetched in the fetch queue based on the fetch address retained in the fetch program counter (FPC) 41, an address calculator 43 outputs an increment value signal 55 of a fetch address counter to a multiplexer 47 and a comparator 45 based on a fetch address 53 and an instruction code length 54.

The comparator 45 allows the increment value signal 55 of the fetch address counter and the branch address stored in the branch address register 42 to be input thereto, and sets a branch signal 46 to be output to the multiplexer 47 to ON ("H" level, for example) if the increment value signal 55 coincides with the branch address.

The branch target address storage register 44 outputs a branch target address signal 56 to the multiplexer 47.

An ALU 48 calculates a branch target address generated by a normal branch instruction (excluding the branch setting instruction in the present embodiment) or the like, and outputs a normal branch address signal 57 to the multiplexer 47. A normal branch signal 49 is a signal which notifies the multiplexer 47 of occurrence of a normal branch instruction (excluding the branch setting instruction in the present embodiment) or the like.

The multiplexer 47 chooses the branch target address signal 56 if the branch signal 46 is ON ("H" level, for example), and outputs the branch target address signal 56 to the fetch program counter (FPC) 41 as a next fetch address signal 52. The multiplexer 47 chooses the normal branch address signal 57 if the normal branch signal 49 is ON ("H" level, for example), and outputs the normal branch address signal 57 to the fetch program counter (FPC) 41 as the next fetch address signal 52. The multiplexer 47 chooses the increment value signal 55 of the fetch address counter if both the branch signal 46 and the normal branch signal 49 are OFF ("L" level, for example), and outputs the increment value signal 55 to the fetch program counter (FPC) 41 as the next fetch address signal 52.

(3) Loop Instruction

FIGS. 5A, 5B, and 5C are views illustrating an example of a loop instruction in the present embodiment.

FIG. 5A shows an example of an instruction code of the loop instruction. FIG. 5B is a view showing a bit field of the instruction code of the loop instruction. An instruction code 410 of the loop instruction includes a 7-bit opcode designation region 412 from the bit 15 to the bit 9, a 3-bit branch address designation region 414 from the bit 8 to the bit 6, a 3-bit branch target address designation region 416 from the bit 5 to the bit 3, and a 3-bit loop count designation region 418 from the bit 2 to the bit 0.

An opcode which indicates that the instruction is a loop instruction is stored in the opcode designation region 412.

A value which indicates whether the branch address or the branch target address is after a certain number of instructions from the branch setting instruction may be designated in the branch address designation region 414 or the branch target address designation region 416. In the case where the value which indicates whether the branch target address is after a certain number of instructions from the branch setting instruction is designated by immediate data "imm3", for example, the branch target address is given by "PC (program counter)+instruction length+imm3×instruction length". The branch address or the branch target address may be designated by either a relative address from the branch setting instruction or an absolute address. A value for a general-purpose register in which the above value is stored may be designated in the branch address designation region 414 or the branch target address designation region 416.

A loop count may be designated in the loop count designation region 418 by immediate data, or a value for a general-purpose register in which the loop count is set may be designated in the loop count designation region 418.

FIG. 5C shows a program list including the loop instruction. In the case where a loop instruction "loop x, y, z" is placed at 420, a branch occurs at P1 (branch address) after x instructions (see 430) from the loop instruction, and processing which causes a branch to P2 (branch target address) after y instructions (see 440) from the loop instruction to occur is repeated z times (z=loop count). After z branches have occurred, an instruction 470 subsequent to the branch address is executed.

Figure 6:
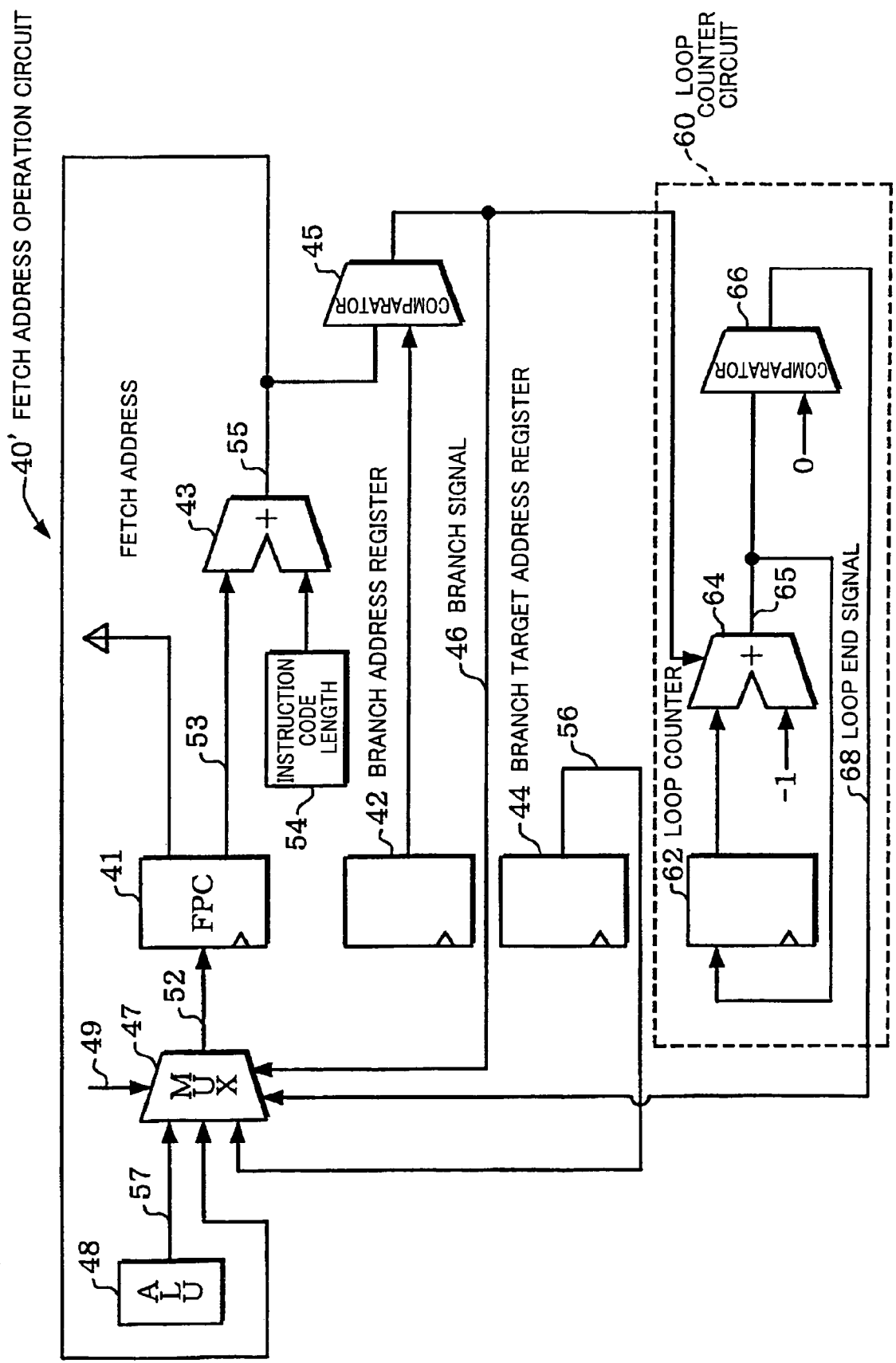
FIG. 6 is a diagram for illustrating a fetch address operation circuit which can process a loop instruction according to one embodiment of the present invention.

FIG. 6 is a view illustrating an example of a configuration of a fetch address operation circuit which can process the loop instruction.

A fetch address operation circuit 40' shown in FIG. 6 includes a loop counter circuit 60 in addition to the configuration of the fetch address operation circuit 40 shown in FIG. 4.

The loop counter circuit 60 includes a loop counter 62, a calculator 64, and a comparator 66. A loop count designated by the loop instruction is retained in the loop counter 62.

The calculator 64 allows the value retained in the loop counter and the branch signal 46 output from the comparator 45 to be input thereto, decrements the loop counter (processing which subtracts "1" from the value of the loop counter) if the branch signal 46 indicates occurrence of a branch (branch signal 46 is ON, "H" level, for example), and outputs a decrement value signal 65 to the loop counter 62 and the comparator 66. This allows the value of the loop counter 62 to be decremented.

If the decrement value signal 65 becomes "0", the comparator 66 judges that branches have occurred a number of times corresponding to the designated loop count, sets a loop end signal 68 to ON, and outputs the loop end signal 68 to the multiplexer 47. The loop end signal 68 is a signal which notifies the multiplexer 47 that the number of loops designated by the loop instruction have been completed. The loop end signal 68 may be judged to be ON if the signal at an "H" level is output, for example.

If the loop end signal 68 is not ON, the multiplexer 47 performs the operation described with reference to FIG. 4. If the loop end signal 68 is ON, the multiplexer 47 chooses the increment value signal 55 of the fetch address counter instead of the branch target address signal 56 even if the branch signal 46 is ON, and outputs the increment value signal 55 to the fetch program counter (FPC) 41 as the next fetch address signal 52.

FIGS. 7A, 7B, and 7C are views illustrating another loop instruction in the present embodiment. This other loop instruction is a loop instruction of the type in which the branch target address is an instruction subsequent to the loop instruction.

FIG. 7A shows an example of an instruction code of another loop instruction (loop instruction 2). FIG. 7B is a view showing a bit field of the instruction code of the loop instruction 2. An instruction code 510 of the loop instruction 2 includes an 8-bit opcode designation region 512 from the bit 15 to the bit 8, a 4-bit branch address designation region 514 from the bit 7 to the bit 4, and a 4-bit loop count designation region 518 from the bit 3 to the bit 0. Since the branch target is fixed in the loop instruction 2, it is unnecessary to designate the branch target address in the operand.

An opcode which indicates that the instruction is a loop instruction of the type in which the branch target address is an instruction subsequent to the loop instruction is stored in the opcode designation region 512.

A value which indicates whether the branch address is after a certain number of instructions from the branch setting instruction may be designated in the branch address designation region 514. In the case where the value which indicates whether the branch address is after a certain number of instructions from the branch setting instruction is designated by immediate data "imm4", for example, the branch address is given by "PC (program counter)+instruction length+ imm4×instruction length". The address may be designated by either a relative address from the branch setting instruction or an absolute address. A value for a general-purpose register in which the above value is stored may be designated in the branch address designation region 514.

The loop count may be designated in the loop count designation region 518 by immediate data, or a value for a general-purpose register in which the loop count is set may be designated in the loop count designation region 518.

FIG. 7C shows a program list including the loop instruction. In the case where a loop instruction 2 "loop x, z" is placed at 520, a branch occurs at P1 (branch address) after x instructions (see 530) from the loop instruction 2, and processing which causes a branch to P2 (branch target address) subsequent to the loop instruction 2 to occur is repeated z times (loop count). After z branches have occurred, an instruction 570 subsequent to the branch address is executed.

In the case where the branch target is fixed in this manner, the fixed branch target address may be set in the branch target address storage register 44 shown in FIG. 6.

The above description is given for a case where the branch target is affixed to the instruction subsequent to the loop instruction. However, the present invention is not limited thereto. For example, the branch target may be affixed to another location.

2. Electronic Equipment

Electronic equipment including the above-described data processing device (microcomputer, for example) is described below.

Figure 8A:
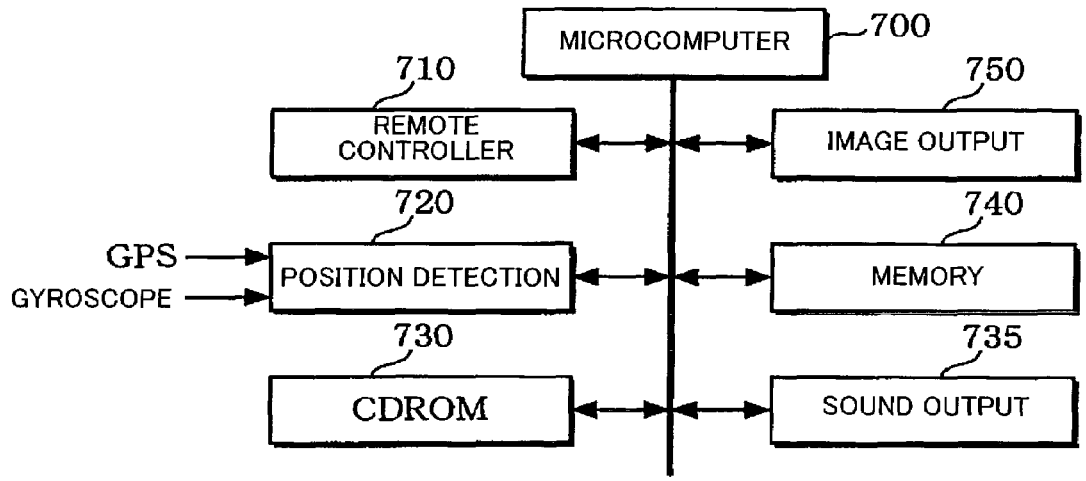
FIGS. 8A, 8B, and 8C are block diagrams showing examples of the electronic equipment having a microcomputer.
Figure 9A:
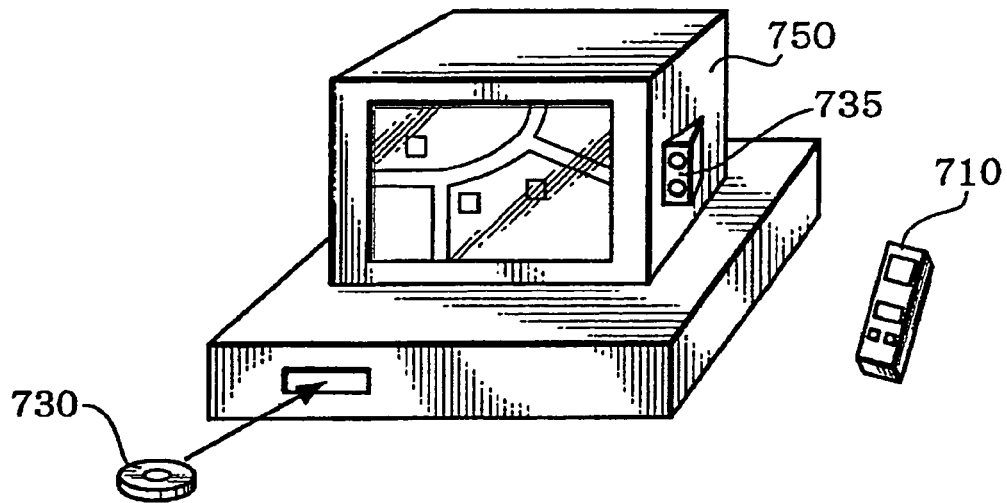
FIGS. 9A, 9B, and 9C show external views of various types of electronic equipment.

FIG. 8A is an internal block diagram of a car navigation system which is an example of electronic equipment. FIG. 9A is an external view of the car navigation system. The car navigation system is operated by using a remote controller 710. A position detection section 720 detects the position of a vehicle based on information from the GPS (global positioning system) or a gyroscope. Information such as a map is stored in a CD-ROM 730 (information storage medium). A memory 740 becomes a work area during image processing or voice processing. An image generated is displayed for the driver by using an image output section 750. Guide voice for car navigation is generated and output for the driver by using a sound output section 735. A microcomputer 700 inputs information thereto from information sources such as the remote controller 710, the position detection section 720, and the CD-ROM 730, performs various types of processing, and outputs the processed information by using output devices such as the image output section 750 and the sound output section 735.

Figure 8B:
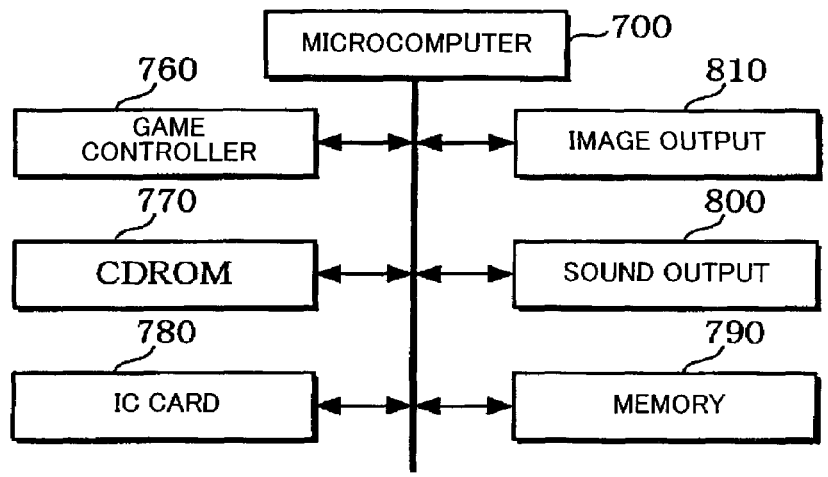
Figure 9B:
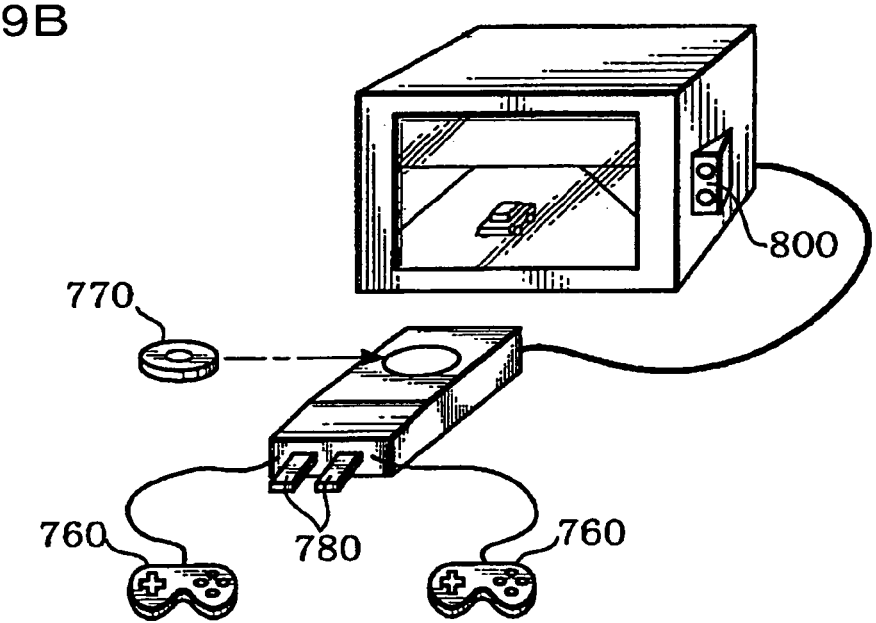

FIG. 8B shows an internal block diagram of a game device which is another example of electronic equipment. FIG. 9B is an external view of the game device. The game device generates a game image and game sound by using a memory 790 as a work area based on operation information of the player from a game controller 760, a game program from a CD-ROM 770, player information from an IC card 780, and the like, and outputs the game image and game sound by using an image output section 810 and a sound output section 800.

Figure 8C:
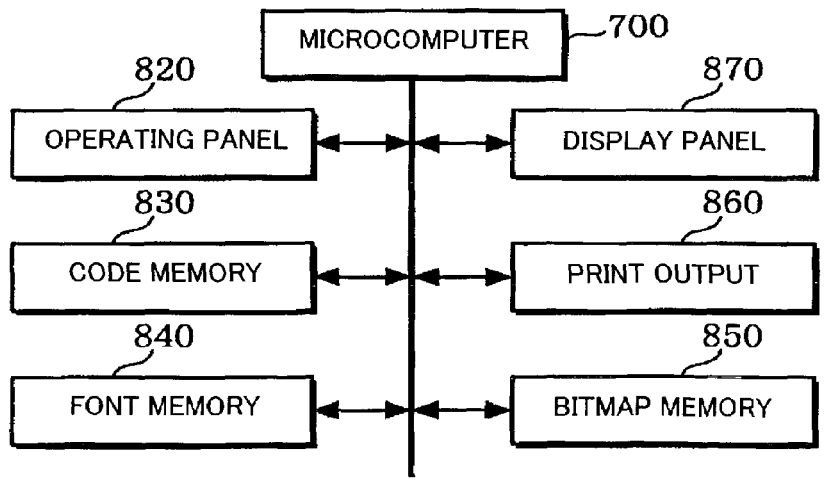
Figure 9C:
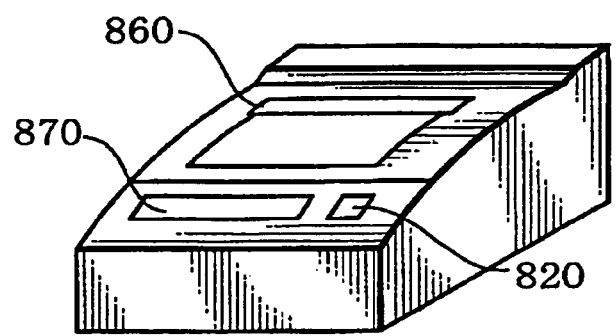

FIG. 8C shows an internal block diagram of a printer which is still another example of electronic equipment. FIG. 9C is an external view of the printer. This printer generates a print image by using a bitmap memory 850 as a work area based on operation information from an operating panel 820 and character information from a code memory 830 and a font memory 840, and outputs the image by using a print output section 860. The printer informs the user of the state and the mode of the printer by using a display panel 870.

As other examples of electronic equipment to which the microcomputer can be applied are a cellular phone, PHS, pager, portable information terminal, digital camera, hard disk device, optical disc (CD and DVD) device, magneto-optical disc (MO) device, audio equipment, electronic notebook, electronic calculator, POS terminal, device equipped with a touch panel, projector, word processor, personal computer, TV, and view finder type or direct viewfinder type video tape recorder can be given.

The present invention is not limited to the above embodiments. Various modifications and variations are possible within the spirit and scope of the present invention.

The configuration of the electronic equipment of the present invention is not limited to the configurations described with reference to FIGS. 8A to 8C and FIGS. 9A to 9C. Various modifications and variations are possible within the spirit and scope of the present invention.

What is claimed is:

1. A data processing device using pipeline control, comprising:
an instruction queue in which a plurality of instruction codes are fetched and stored;
a fetch address operation circuit that calculates a fetch address, the fetch address being used to fetch and store an instruction code in the instruction queue;
a fetch circuit that fetches an instruction code, the instruction code being read out from a memory based on the fetch address and being stored into the instruction queue; and
a branch information setting circuit that decodes a branch setting instruction, the branch setting instruction explicitly or implicitly specifying a branch occurring address and a branch target address, a branch to the branch target address occurring when the fetch address is the branch occurring address after a x-th instruction from the branch setting instruction, x being a non-zero positive integer, the branch information setting circuit storing the branch occurring address in a branch occurring address storage register and the branch target address in a branch target address storage register, when the branch setting instruction is decoded,
the fetch address operation circuit including a circuit that compares one of a previous fetch address and an expected next fetch address with a value stored in the branch occurring address storage register, and then determines whether or not to output a value stored in the branch target address storage register as a next fetch address, based on the comparison result.

2. The data processing device as defined in claim 1:
the branch setting instruction including a loop instruction that designates a loop count and instructs to repeat a branch from the branch occurring address to the branch target address the number of times equal to the loop count;
the branch information setting circuit decoding the loop instruction, and storing the loop count designated by the loop instruction; and
the fetch address operation circuit including a circuit that outputs a value that is stored in the branch target address storage register as a next fetch address until the number of times the branch to the branch target address occurs reaches the loop count.

3. The data processing device as defined in claim 2:
the branch setting instruction including a loop instruction that designates a loop count and instructs to repeat a branch from the branch occurring address to the branch target address the number of times equal to the loop count;
the branch information setting circuit decoding the loop instruction, and storing the loop count designated by the loop instruction into a loop counter; and
the fetch address operation circuit including a circuit that decrements a value set in the loop counter each time when a branch to the branch target address occurs, and outputs a value that is obtained by incrementing the branch occurring address by one instruction length as a next fetch address when the value of the loop counter reaches zero.

4. The data processing device as defined in claim 2: the loop instruction having no branch target address information in an operand; and the branch information setting circuit including a circuit that calculates the branch target address based on the address in memory where the loop instruction is stored and a fixed value, and stores the calculated value in the branch target address storage register.

5. Electronic equipment comprising:
   the data processing device as defined in claim 2;
   means for receiving input data; and
   means for outputting a result of a process performed by the data processing device based on the input data.

6. The data processing device as defined in claim 1:
   the branch setting instruction including a loop instruction that designates a loop count and instructs to repeat a branch from the branch occurring address to the branch target address the number of times equal to the loop count;
   the branch information setting circuit decoding the loop instruction, and storing the loop count designated by the loop instruction into a loop counter; and
   the fetch address operation circuit including a circuit that decrements a value set in the loop counter each time when a branch to the branch target address occurs, and outputs a value that is obtained by incrementing the branch occurring address by one instruction length as a next fetch address when the value of the loop counter reaches zero.

7. The data processing device as defined in claim 6: the loop instruction having no branch target address information in an operand; and the branch information setting circuit including a circuit that calculates the branch target address based on the address in memory where the loop instruction is stored and a fixed value, and stores the calculated value in the branch target address storage register.

8. Electronic equipment comprising:
   the data processing device as defined in claim 6;
   means for receiving input data; and
   means for outputting a result of a process performed by the data processing device based on the input data.

9. Electronic equipment comprising:
   the data processing device as defined in claim 1;
   means for receiving input data; and
   means for outputting a result of a process performed by the data processing device based on the input data.

10. A data processing device using pipeline control, comprising:
    an instruction queue in which a plurality of instruction codes are fetched and stored;
    a fetch address operation circuit that calculates a fetch address, the fetch address being used to fetch and store an instruction code in the instruction queue;
    a fetch circuit that fetches an instruction code, the instruction code being read out from a memory based on the fetch address and being stored into the instruction queue; and
    a branch information setting circuit that decodes a branch setting instruction, the branch setting instruction explicitly or implicitly specifying a branch occurring address and a branch target address, a branch to the branch target address occurring when the fetch address is the branch occurring address after a x-th instruction from the branch setting instruction, x being a non-zero positive integer, the branch information setting circuit storing the branch occurring address in a branch occurring address storage register and the branch target address in a branch target address storage register, when the branch setting instruction is decoded,
    the fetch address operation circuit including a circuit that compares an expected next fetch address obtained by incrementing a value in a fetch program counter by one instruction length with a value stored in the branch occurring address storage register, and then outputs a value stored in the branch target address storage register as a next fetch address when the expected next fetch address coincides with the value in the branch occurring address storage register, or outputs the expected next fetch address as a next fetch address when the expected next fetch address does not coincide with the value in the branch occurring address storage register.

11. The data processing device as defined in claim 10:
    the branch setting instruction including a loop instruction that designates a loop count and instructs to repeat a branch from the branch occurring address to the branch target address the number of times equal to the loop count;
    the branch information setting circuit decoding the loop instruction, and storing the loop count designated by the loop instruction; and
    the fetch address operation circuit including a circuit that outputs a value that is stored in the branch target address storage register as a next fetch address until the number of times the branch to the branch target address occurs reaches the loop count.

12. The data processing device as defined in claim 11:
    the branch setting instruction including a loop instruction that designates a loop count and instructs to repeat a branch from the branch occurring address to the branch target address the number of times equal to the loop count;
    the branch information setting circuit decoding the loop instruction, and storing the loop count designated by the loop instruction into a loop counter; and
    the fetch address operation circuit including a circuit that decrements a value set in the loop counter each time when a branch to the branch target address occurs, and outputs a value that is obtained by incrementing the branch occurring address by one instruction length as a next fetch address when the value of the loop counter reaches zero.

13. The data processing device as defined in claim 11: the loop instruction having no branch target address information in an operand; and the branch information setting circuit including a circuit that calculates the branch target address based on the address in memory where the loop instruction is stored and a fixed value, and stores the calculated value in the branch target address storage register.

14. Electronic equipment comprising:
    the data processing device as defined in claim 11;
    means for receiving input data; and
    means for outputting a result of a process performed by the data processing device based on the input data.

15. The data processing device as defined in claim 10:
    the branch setting instruction including a loop instruction that designates a loop count and instructs to repeat a branch from the branch occurring address to the branch target address the number of times equal to the loop count;
    the branch information setting circuit decoding the loop instruction, and storing the loop count designated by the loop instruction into a loop counter; and the fetch address operation circuit including a circuit that decrements a value set in the loop counter each time when a branch to the branch target address occurs, and outputs a value that is obtained by incrementing the branch occurring address by one instruction length as a next fetch address when the value of the loop counter reaches zero.

16. The data processing device as defined in claim 15: the loop instruction having no branch target address information in an operand; and the branch information setting circuit including a circuit that calculates the branch target address based on the address in memory where the loop instruction is stored and a fixed value, and stores the calculated value in the branch target address storage register.

17. Electronic equipment comprising:

the data processing device as defined in claim 15;

means for receiving input data; and means for outputting a result of a process performed by the data processing device based on the input data.

18. Electronic equipment comprising:

the data processing device as defined in claim 10;

means for receiving input data; and means for outputting a result of a process performed by the data processing device based on the input data.

* * * * *